(12) United States Patent
Sun et al.

(10) Patent No.: US 6,932,165 B1
(45) Date of Patent: Aug. 23, 2005

(54) CONTROLLING MECHANISM OF PNEUMATIC TOOL

(76) Inventors: Yung Yung Sun, P.O. Box 2103, Taichung City (TW); Chuan-Ching Cheng, P.O. Box 2103, Taichung (TW)

( * ) Notice: Subject to any disclaimer, the term of this patent is extended or adjusted under 35 U.S.C. 154(b) by 0 days.

(21) Appl. No.: 10/883,688

(22) Filed: Jul. 6, 2004

(51) Int. Cl.[7] ............................................. B23Q 45/04
(52) U.S. Cl. ........................ 173/169; 173/168; 173/218
(58) Field of Search ................................. 173/168, 169, 173/170, 218, 216, 171

(56) References Cited

U.S. PATENT DOCUMENTS

| | | | |
|---|---|---|---|
| 4,243,111 A * | 1/1981 | Willoughby et al. | 173/169 |
| 4,267,747 A * | 5/1981 | Wallace et al. | 74/526 |
| 4,444,091 A * | 4/1984 | Jorgensen, Jr. | 91/427 |
| 4,721,166 A * | 1/1988 | Clapp et al. | 173/177 |
| 4,802,313 A * | 2/1989 | Smith | 451/90 |
| 4,834,131 A * | 5/1989 | Austin | 137/115.26 |
| 5,235,784 A * | 8/1993 | Oki et al. | 451/355 |
| 5,964,302 A * | 10/1999 | Lin | 173/169 |
| 5,974,611 A * | 11/1999 | Casella | 15/3.52 |
| 6,502,647 B1 * | 1/2003 | Krzyzewski et al. | 173/170 |
| 6,644,419 B1 * | 11/2003 | Chen | 173/169 |

* cited by examiner

Primary Examiner—Scott A. Smith

(57) ABSTRACT

A controlling mechanism of pneumatic tool. The controlling mechanism is formed with a radial hole in which a speed adjustment button and a direction switching button are disposed. A pad member is disposed between the speed adjustment button and direction switching button. The speed adjustment button is formed with an axial through hole in which a pin member is inserted. One end of the pin member is formed with a through hole. A valve rod is passed through a through hole of an inlet passage of the main body of the pneumatic tool and inserted into the through hole of the pin member. When the pin member is driven, the valve rod is driven to bias a valve plate, whereby the air can get into the main body of the pneumatic tool.

1 Claim, 6 Drawing Sheets

CONTROLLING MECHANISM OF PNEUMATIC TOOL

BACKGROUND OF THE INVENTION

The present invention is related to an improved controlling mechanism of a pneumatic tool, and more particularly to a controlling mechanism in which the valve of the intake structure and the forward/backward operation switching structure are modified to enhance the utility of the pneumatic tool.

FIGS. 4 to 7 show a conventional controlling mechanism of a pneumatic tool. The pneumatic tool has a main body 7 formed with an inlet passage 71 through which air flows into a pneumatic motor disposed in the main body. A flow regulating button 72 is radially disposed in the inlet passage 71. The flow regulating button 72 is coaxially connected with a direction switching button 73. One end of the direction switching button 73 protrudes from the main body 7 and is connected with a shift bar 74 for driving the direction switching button 73 so as to switch the pneumatic tool between forward operation and backward operation. The direction switching button 73 is formed with an axial valve opening 75. A valve rod 76 axially extends into the valve opening 75. One end of the valve rod 76 extends out of the main body 7 and is pushed by a press lever 77. The other end of the valve rod 76 is pushed by a spring 78 disposed in the flow regulating button 72, whereby a washer 79 blocks the valve opening 75.

In operation of the conventional controlling mechanism, the air first gets into the flow regulating button 72. When the press lever 77 is pressed to drive the valve rod 76, the valve rod 76 is pushed away from the valve opening 75, whereby the air in the flow regulating button 72 will enter the direction switching button 73. At this time, in accordance with the forward or backward operation adjusted and set by the shift bar 74 of the direction switching button 73, the air will enter the pneumatic motor 8 to drive the same to forward operate or backward operate. When the press lever 77 is released, the valve rod 76 is pushed by the spring 78 to make the washer 79 block the valve opening 75.

The shift bar 74 protrudes from one side of the main body 7 so that the shift bar 74 is subject to collision and breakage. The shift bar 74 is disposed between the press lever 77 and the main body 7 for driving the direction switching button 73. After the direction switching button 73 is rotated, one of two air conducting holes 81, 82 is aligned with and communicates with the air inlet 83 of the pneumatic motor 8. The two air conducting holes 81, 82 have a certain diameter for necessary amount of air. Therefore, the central lines of the two air conducting holes 81, 82 must contain an angle of 90 degrees so as to truly separate the incoming air from the outgoing air. Therefore, when using the shift bar 74 to change the operation direction of the pneumatic motor 8, it is necessary to rotate the shift bar 74 by 90 degrees. As a result, the shift bar 74 should not be too wide. Moreover, in order to avoid leakage, a washer 79 (O-ring) must added to the direction switching button 73 driven by the shift bar 74. This leads to resistance against rotation of the direction switching button. Therefore, the shift bar 74 must have a considerable length, that is, the length (application force arm) of the shift bar 74 should not be too short. Due to the above factors of width, length and position of the shift bar 74, the shift bar 74 is easy to be broken.

Furthermore, the valve rod 76 is positioned in the direction switching button 73 and extends through the valve opening 75. Therefore, in design, the diameter of the valve rod 76 is limited. As a result, the washer 79 for blocking the valve opening 75 should not be too coarse. Therefore, after continuously opened and closed, the washer 79 is subject to wear. This will lead to leakage of air.

SUMMARY OF THE INVENTION

It is therefore a primary object of the present invention to provide a controlling mechanism of a pneumatic tool, in which the valve can truly seal the inlet passage. In addition, the conventional shift bar of the direction switching button is replaced with a rotary button.

According to the above object, the controlling mechanism of the pneumatic tool includes a main body having an inlet passage through which air flows into a pneumatic motor. A rear end of the inlet passage has a through hole. A radial hole passes through the through hole for receiving a speed adjustment button and a direction switching button.

The speed adjustment button is formed with an axial through hole in which a pin member is inserted. One end of the pin member protrudes from the main body and is pushed by a pressboard. The other end of the pin member is formed with a through hole. A valve rod is inserted through the through hole of the inlet passage into the through hole of the pin member. The valve rod is connected with a valve plate to form a valve for blocking the inlet passage and preventing air from getting into the inlet passage.

A pad member is disposed between the direction switching button and the speed adjustment button. The direction switching button and the speed adjustment button are both fixed in the radial hole of the main body by a pin member.

When a force is applied to the pressboard, the valve rod is driven to bias the valve plate, whereby the air can go through the valve into the receiving space of the speed adjustment button. Then the air goes through an opening defined by the speed adjustment button and the pad member into the direction switching button. Then the direction switching button can control the operation direction of the pneumatic motor.

The present invention can be best understood through the following description and accompanying drawings wherein:

DETAILED DESCRIPTION OF THE PREFERRED EMBODIMENT

Figure 1:
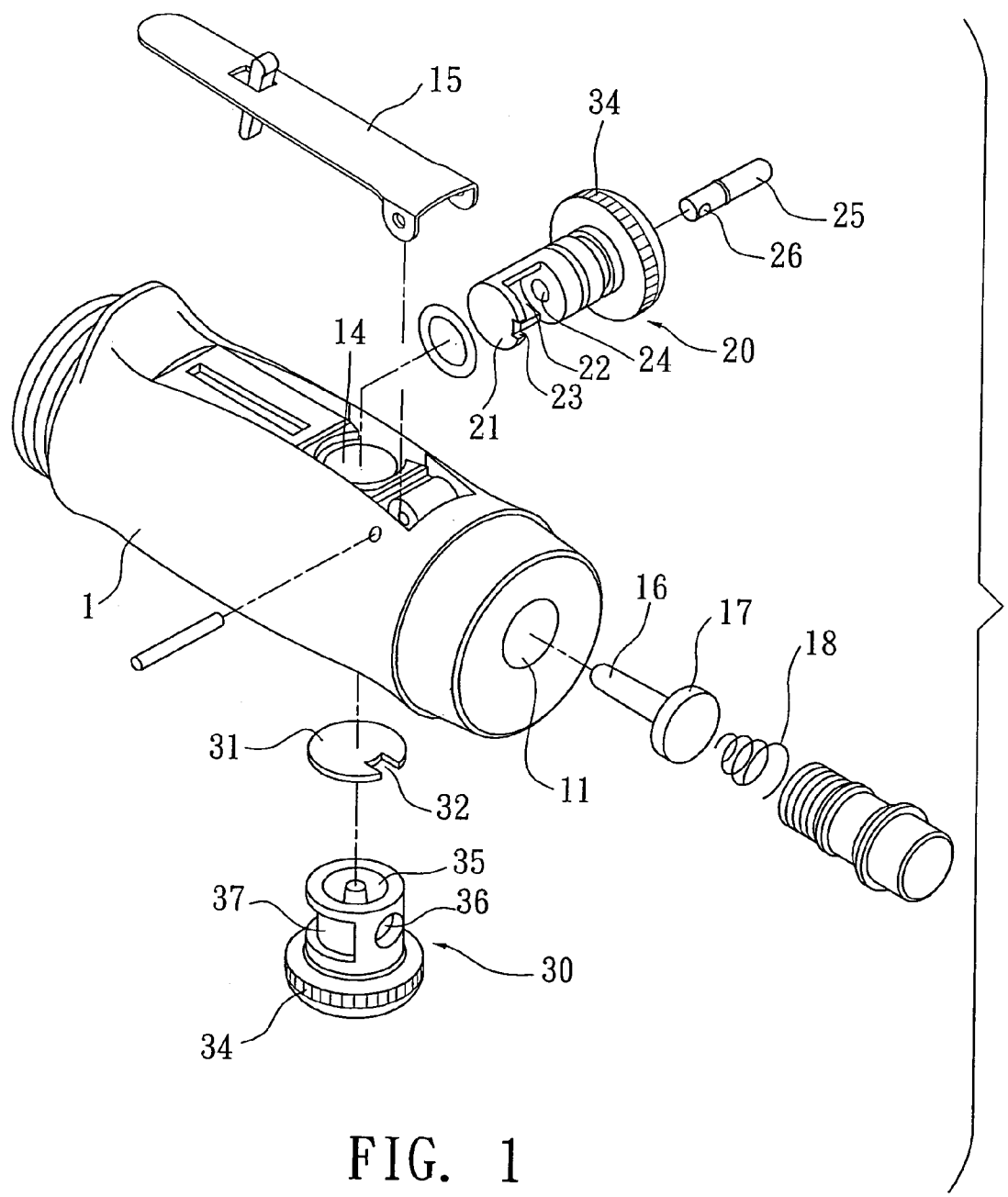
FIG. 1 is a perspective exploded view of the present invention.
Figure 2:
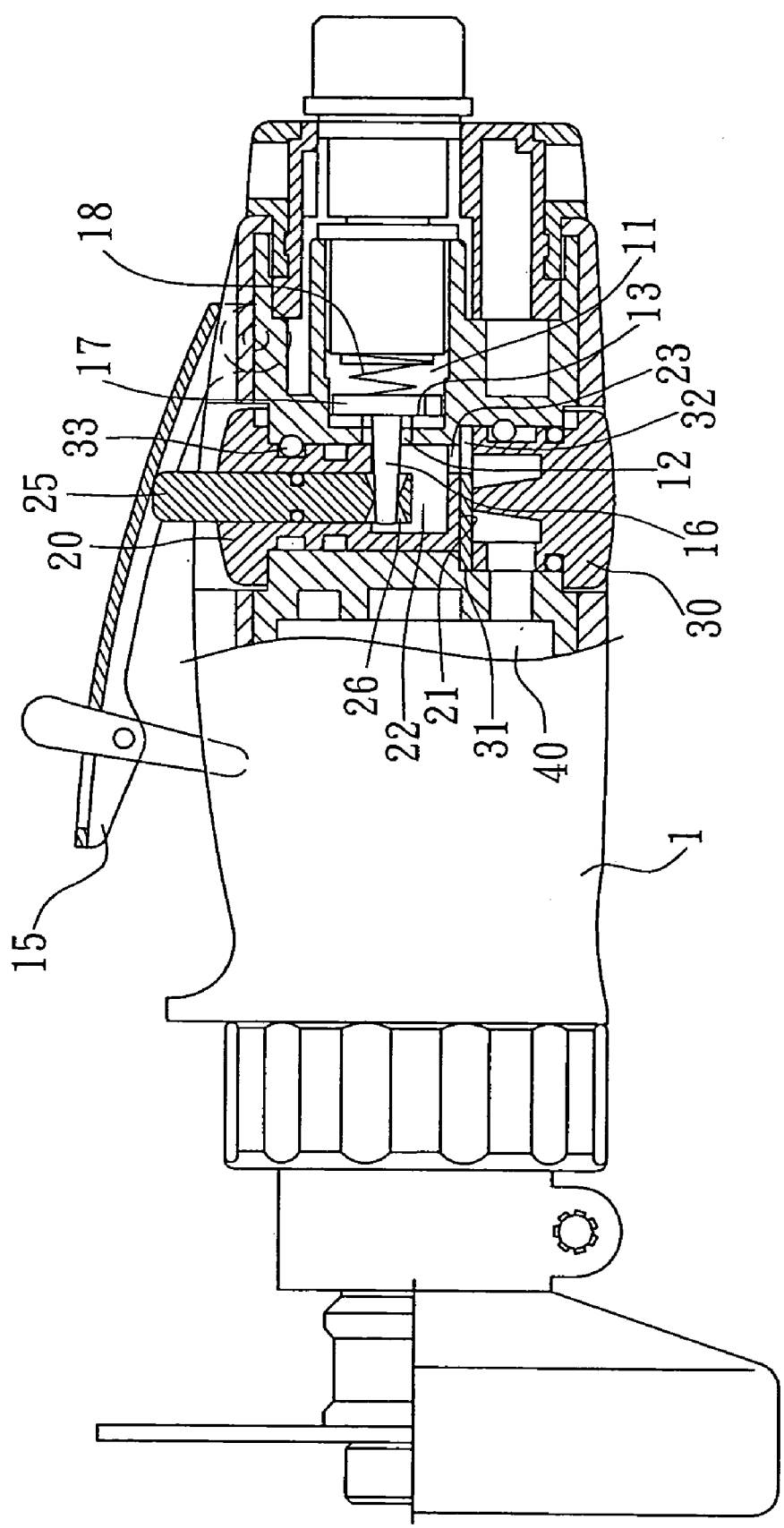
FIG. 2 is a sectional view of the present invention.
Figure 3:
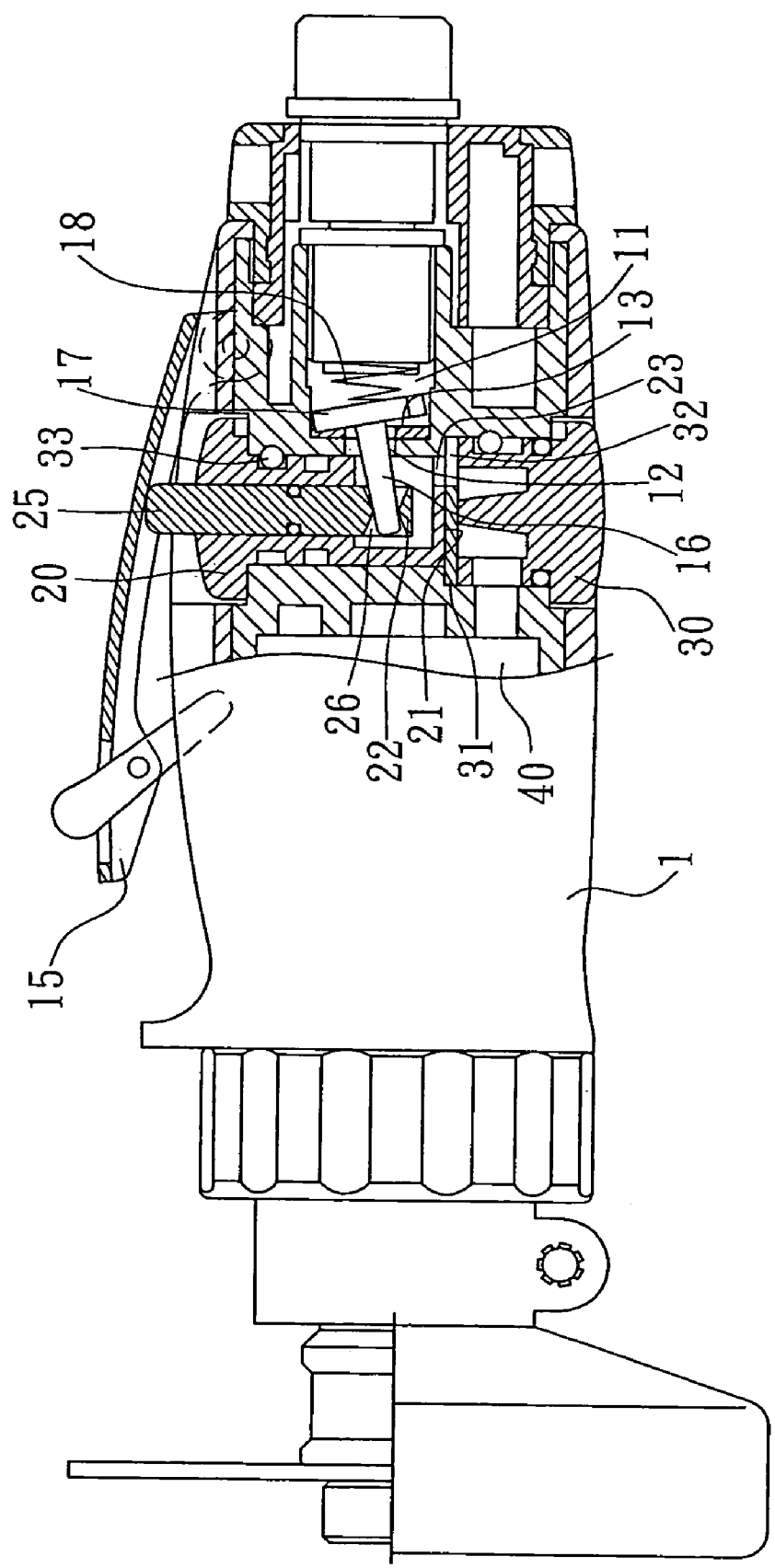
FIG. 3 is a sectional view according to FIG. 3, showing the operation of the present invention.
Figure 4:
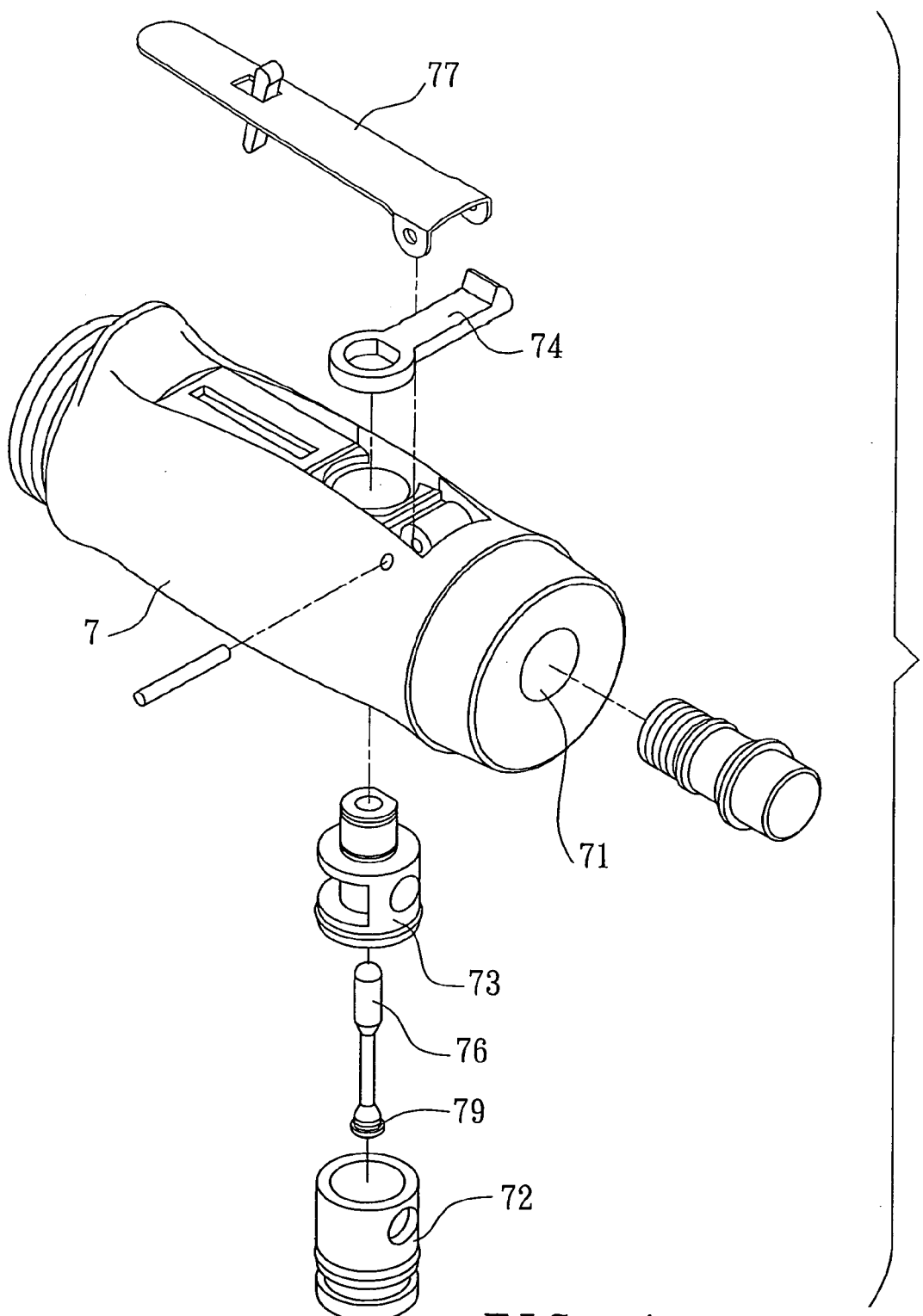
FIG. 4 is a perspective exploded view of a conventional controlling mechanism of a pneumatic tool.
Figure 5:
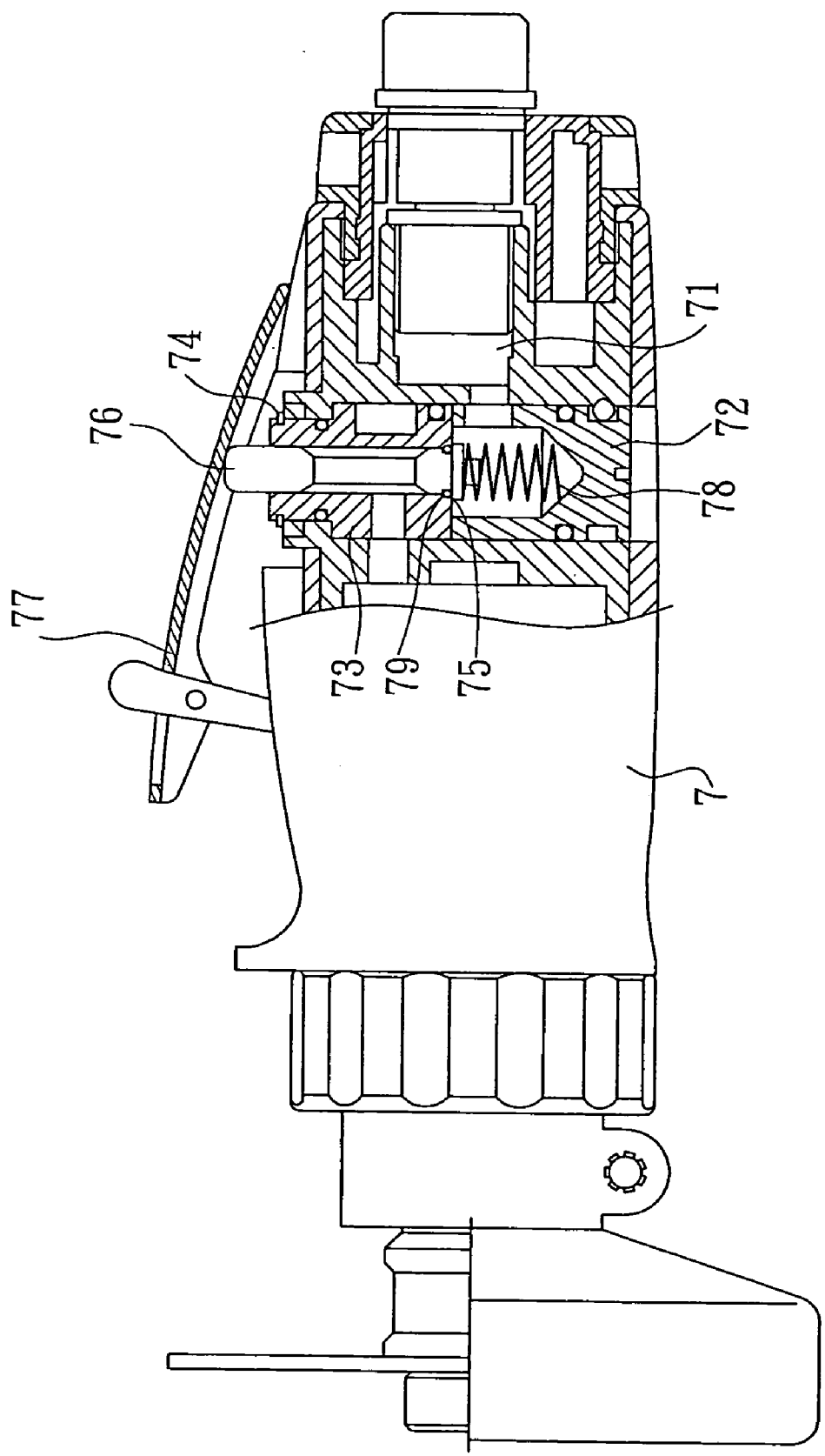
FIG. 5 is a sectional view of the conventional controlling mechanism of the pneumatic tool.
Figure 7:
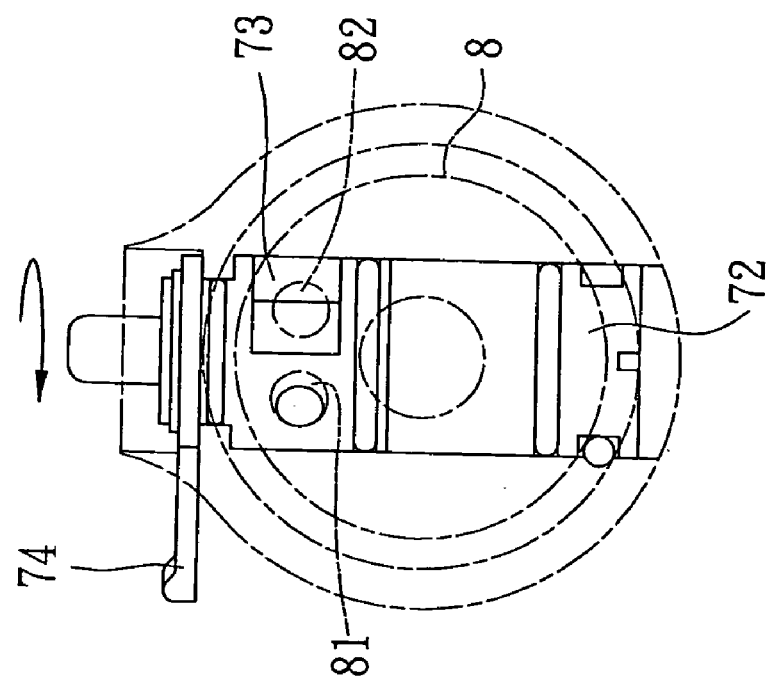
FIG. 7 shows the intake of the backward operation of the conventional controlling mechanism of the pneumatic tool.
Figure 6:
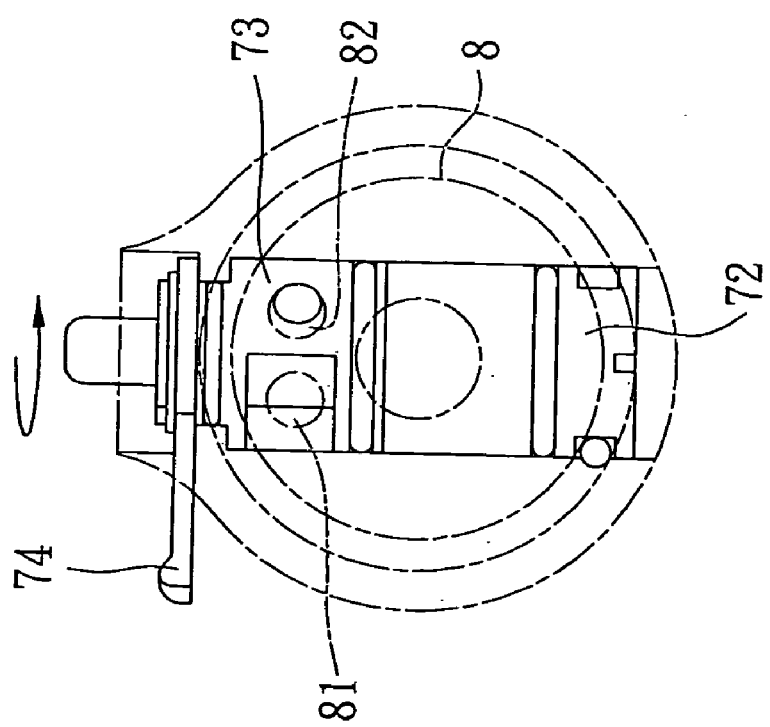
FIG. 6 shows the intake of the forward operation of the conventional controlling mechanism of the pneumatic tool.

Please refer to FIGS. 1 to 3. The present invention is related to a controlling mechanism of pneumatic tool. The pneumatic tool includes a main body 1. The main body 1 has an inlet passage 11 through which air flows into a pneumatic motor 40 disposed in the main body 1. A rear end of the inlet passage 11 has a through hole 12 with a diameter smaller than the diameter of the inlet passage 11. The inlet passage 11 contacts with the through hole 12 to form a stop face 13. A radial hole 14 passes through the through hole 12 for receiving a speed adjustment button 20 and direction switching button 30.

The speed adjustment button 20 has an end board 1 and a receiving space 22 adjacent to the end board 21. The receiving space 22 is open on one side of the speed adjustment button 20. One side of the end board 21 is formed with a notch 23 communicating with the receiving space 22. The speed adjustment button 20 is formed with an axial through hole 24 in which a pin member 25 is inserted. One end of the pin member 25 protrudes from the main body 1 and is pushed by a pressboard 15. The other end of the pin member 25 extends into the receiving space 22 and is formed with a through hole 26. A valve rod 16 is inserted through the through hole 12 into the through hole 26. The valve rod 16 is connected with a valve plate 17. A spring 18 pushes the valve plate 17 against the stop face to prevent the air from getting in.

The direction switching button 30 and the speed adjustment button 20 are coaxially arranged and separated by a pad member 31. One side of the pad member 31 is formed with a notch 32. The direction switching button 30 and the speed adjustment button 20 are both fixed in the radial hole 14 of the main body 1 by a pin member 33. The direction switching button 30 and the speed adjustment button 20 are formed with slipproof stripes 34. The direction switching button 31 has an axial air conducting space 35 communicating with the notch 32 of the pad member 31. A lateral face of the direction switching button 30 is formed with an air inlet 36 and an air exhaustion passage 37. The air inlet 36 communicates with the air conducting space 35 and the air inlet 41 of the pneumatic motor 40.

When a force is applied to the pressboard, the valve rod 16 is driven to bias the valve plate 17, whereby a gap is formed, permitting the air to go through the valve plate 17 into the receiving space 22 of the speed adjustment button 20. Then the air goes through an opening defined by the speed adjustment button 20 and the pad member 31 into the direction switching button 30. The air conducting hole of the direction switching button 30 is aligned with the air inlet 41 of the pneumatic motor 40 so as to switch the pneumatic motor 40 between forward and backward operation for controlling airflow and operation direction.

The above embodiment is only used to illustrate the present invention, not intended to limit the scope thereof. Many modifications of the above embodiment can be made without departing from the spirit of the present invention.

What is claimed is:

1. A controlling mechanism of pneumatic tool, the pneumatic tool comprising a main body, the main body having an inlet passage through which air flows into a pneumatic motor disposed in the main body, a rear end of the inlet passage having a through hole with a diameter smaller than the diameter of the inlet passage, a radial hole passing through the through hole for receiving a speed adjustment button and a direction switching button, the speed adjustment button having an end board and a receiving space adjacent to the end board, the receiving space being open on one side of the speed adjustment button, one side of the end board being formed with a notch communicating with the receiving space, the speed adjustment button being formed with an axial through hole in which a pin member is inserted, one end of the pin member protruding from the main body and being pushed by a pressboard, the other end of the pin member extending into the receiving space and being formed with a through hole, a valve rod being inserted through the through hole of the inlet passage into the through hole of the pin member, the valve rod being connected with a valve plate for blocking the through hole of the inlet passage, a pad member being disposed between the direction switching button and the speed adjustment button, the pad member being formed with a notch, the direction switching button and the speed adjustment button being both fixed in the radial hole of the main body by a pin member.

* * * * *